United States Patent [19]

Kenoun

[11] Patent Number: 4,798,093
[45] Date of Patent: Jan. 17, 1989

[54] APPARATUS FOR SENSOR COMPENSATION

[75] Inventor: Robert Kenoun, Morton Grove, Ill.

[73] Assignee: Motorola, Inc., Schaumburg, Ill.

[21] Appl. No.: 872,345

[22] Filed: Jun. 6, 1986

[51] Int. Cl.⁴ .......................... G01L 7/08; G01L 9/04; G01L 19/04
[52] U.S. Cl. ...................................... 73/708; 73/720; 73/726
[58] Field of Search ................. 73/708, 720, 721, 726, 73/727, 862.35, 862.47, 862.63, 862.65; 338/4, 3; 330/146, 256

[56] References Cited

U.S. PATENT DOCUMENTS

| | | | |
|---|---|---|---|
| 3,836,796 | 9/1974 | Solomon et al. | 73/708 |
| 4,198,868 | 4/1980 | Runyan | 73/708 |
| 4,233,848 | 11/1980 | Sato et al. | 73/708 |
| 4,337,665 | 7/1982 | Sato et al. | 73/708 |
| 4,355,537 | 10/1982 | Vander Have | 73/708 |
| 4,414,837 | 11/1983 | Bioe et al. | 73/766 |
| 4,419,598 | 12/1983 | Spitz et al. | 310/311 |
| 4,442,717 | 4/1984 | Kurtz et al. | 73/766 |
| 4,462,018 | 7/1984 | Yang et al. | 73/708 |
| 4,480,478 | 11/1984 | Sato et al. | 73/708 |
| 4,492,122 | 1/1985 | Dimeff | 73/708 |
| 4,510,813 | 4/1985 | Kanazawa | 73/766 |
| 4,556,807 | 12/1985 | Yamada et al. | 73/708 |
| 4,604,899 | 8/1986 | Yamada et al. | 73/708 |

OTHER PUBLICATIONS

Schematic Diagram for Motorola Part No. CA3260.

Primary Examiner—Donald O. Woodiel
Attorney, Agent, or Firm—Robert J. Crawford; John H. Moore

[57] ABSTRACT

Disclosed is an apparatus for pressure sensor compensation. The invention is best suited for pressure sensors of the type which may be mounted about a flexible member such that the resistance of one or more strain gauge resistors mounted thereon changes as pressure is exerted upon the flexible member. The pressure sensing apparatus comprises a bridge resistor arrangement for sensing pressure, and bridge control circuitry, coupled to an input terminal of the bridge, for compensating temperature induced variances in the bridge by controlling the voltage at the input terminal. The bridge has at least a first strain gauge resistor mounted on the flexible member, and at least one output terminal having a voltage which changes as pressure is exerted upon the flexible member. The bridge control circuitry has an additional strain gauge resistor which is used to monitor the temperature of the first strain gauge resistor.

14 Claims, 2 Drawing Sheets

4,798,093

APPARATUS FOR SENSOR COMPENSATION

FIELD OF THE INVENTION

The present invention relates generally to pressure sensors, and, more particularly, to temperature compensation for pressure sensors using a Wheatstone Bridge resistor arrangement.

DESCRIPTION OF THE PRIOR ART

Pressure sensors implemented using diaphragms have been known and successfully used for some time. Typically, a Wheatstone Bridge arrangement of resistors in a diaphragm is used to detect a change in pressure on the diaphragm. In particular, the bridge circuit includes two opposing legs, each of which contains two resistors with either a positive or negative output terminal located between the resistors. Further, the resistors in each of the legs are strain gauge resistors, i.e., of the pressure sensitive type, (usually semiconductor resistors) to realize maximum sensitivity. By positioning two non-adjacent resistors in the center of the diaphragm and the remaining two non-adjacent resistors along the edges of the diaphragm, pressure exerted upon the diaphragm causes the output terminals to exhibit a corresponding output voltage, thereby sensing the pressure through a voltage differential.

Although such practice is successfully employed in single temperature applications, in applications which experience substantial temperature variations, the accuracy of the above described circuit is severely degraded. The cause of this degradation is twofold. First, the resistors which comprise the Wheatstone Bridge cannot typically be matched to one another. Thin film techniques presently used typically match such resistors to within only 5–10%. When two resistors having substantially different values experience a change in temperature, their corresponding rates of change, as a function of temperature, will also differ. This varying rate of change of resistance (as a function of temperature) results in a differing rate of change of output voltage as a function of pressure, for any given temperature. For a given pressure exerted upon the diaphragm, two different temperatures will result in two different output voltages. This undesired voltage difference, for a given pressure, is commonly referred to as "TC of offset", or "offset drift". Often, the degradation, due to temperature variation, is too severe even when the values of the resistors in the bridge are within 5% of each other.

The second reason the above described circuit may experience severe degradation with temperature relates to the excitation voltage applied at the input of the Wheatstone Bridge. The input voltage to the bridge is a function of the bridge resistors and often other element values in the circuit. If the values of these elements change and effect the excitation voltage, the changed excitation voltage will cause the pressure versus output voltage relation to become offset. Hence, for any given pressure, an offset in output voltage will be experienced. This offset is commonly referred to as temperature compensation of span (TC of span).

There have been attempts to overcome these two problems, a few of which have experienced some success. On successful approach utilizes thermistors in series with selected bridge resistors, thereby offsetting resistor changes due to temperature. However, such practice only minimizes the problem of resistor value fluctuation and does not truly compensate for TC offset and span voltage.

In other attempts to alleviate the problems of TC offset and span voltage, a thermistor is positioned between the excitation voltage source (DC input to the bridge) and the input terminal to the Wheatstone Bridge. The thermistor changes the excitation voltage to maintain a constant overall bridge current as temperature causes a change in bridge resistance. Since the resistance of a thermistor varies inversely with temperature, and the resistance of a semiconductor resistors varies directly with temperature, some compensation is provided. However, this compensation is not accurate over a wide range of temperatures.

The resistance characteristic of a thermistor has an inverse exponential relation to temperature, while a semiconductor resistor has a direct linear relation to temperature. Hence, the compensation which the thermistor provides is only accurate over a small segment of the exponential decay (a small segment of an exponential function can be approximated as linear).

Accordingly, there is a need for a pressure sensing apparatus which will maintain accurate pressure readings over a wide range of temperatures.

OBJECTS AND SUMMARY OF THE PRESENT INVENTION

It is a general an object of the present invention to provide an improved pressure sensing apparatus which overcomes the above described shortcomings.

It is a further object of the present invention to provide an improved pressure sensing apparatus which will maintain accurate pressure readings over a wide range of temperatures.

It is yet a further object of the present invention to provide an improved pressure sensing apparatus which will accurately accommodate temperature changes in strain gauge resistors configured in a bridge arrangement.

In brief, the present invention pertains to a pressure sensing apparatus of the type which automatically compensates for temperature variance, and which may be mounted about a flexible member such that the resistance of one or more strain gauge resistors mounted thereon changes as pressure is exerted upon the flexible member. The pressure sensing apparatus comprises bridge means, having an input terminal, for sensing pressure, and bridge control circuitry, coupled to the input terminal, for compensating temperature induced variances at the bridge by controlling the voltage at the bridge input terminal. The bridge means includes at least a first strain gauge resistor mounted on the flexible member, and at least one output terminal having a voltage which changes as pressure is exerted upon the flexible member. The bridge control circuitry has an additional strain gauge resistor which is situated to monitor the temperature of the first strain gauge resistor.

When pressure is applied upon the flexible member, the first strain gauge resistor will experience a variation in its resistance which is typically a linear function resulting in a corresponding voltage at the output terminal of the bridge. When temperature causes an undesirable voltage at the output terminal of the bridge, the additional strain gauge resistor in the bridge control circuitry experiences this temperature effect, and, as its resistance varies, the bridge control circuitry modifies the voltage at the input terminal of the bridge to maintain an accurate output voltage, i.e. an accurate pressure reading.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in which like reference numerals identify like elements, and wherein:

DETAILED DESCRIPTION OF THE PREFERRED EMBODIMENT

Figure 1:
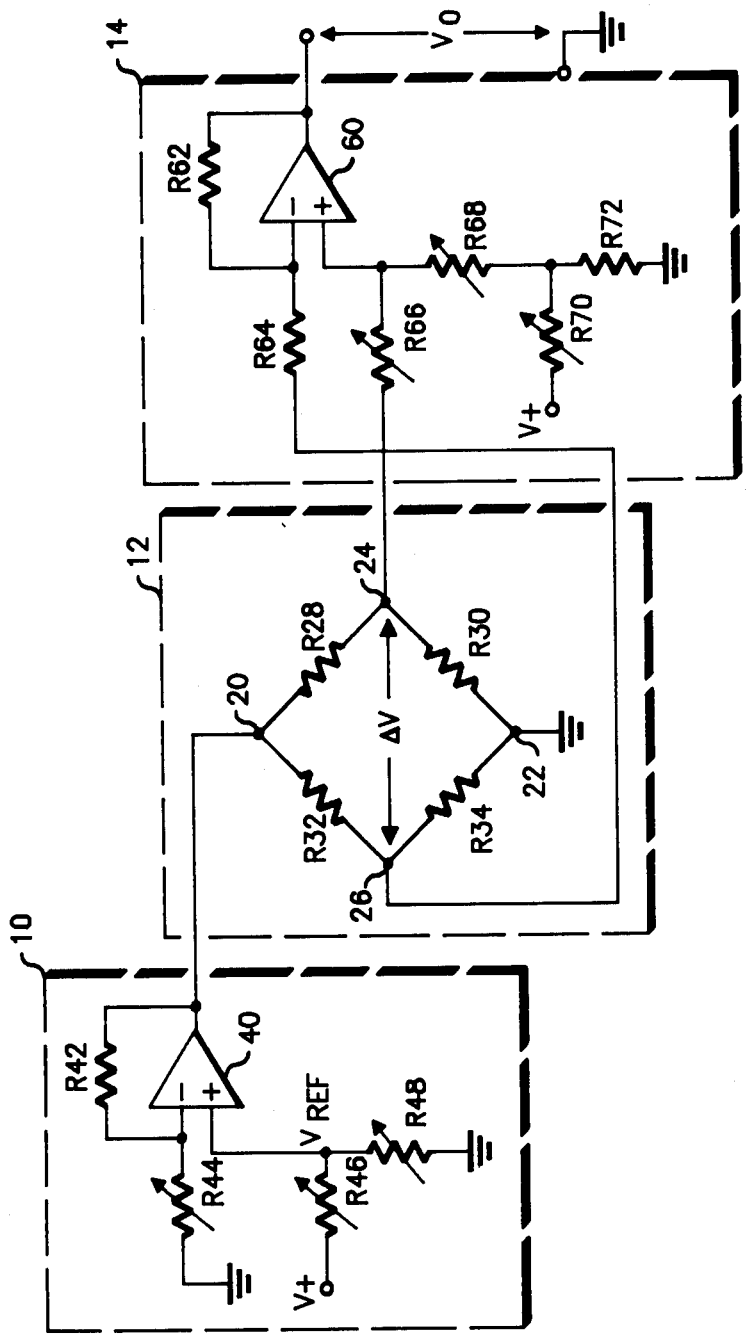
FIG. 1 is a schematic representation of a pressure sensor compensation apparatus in accordance with the present invention.

Referring to FIG. 1, a sensor compensation circuit is identified in three sections, blocks 10, 12 and 14. Block 12 depicts the pressure sensing section of the circuit, which includes a bridge resistor arrangement (bridge). The bridge includes two legs connecting an input terminal 20 to a ground terminal 22. One leg of the bridge comprises strain gauge resistors 28 and 30, while the other leg comprises two resistors 32 and 34 which are structured such that they are insensitive to temperature and pressure. It is preferred that resistors 28 and 30 have the same resistor values, and that resistors 32 and 34 also have the same resistor values.

Strain gauge resistors are typically semiconductor resistors formed on a thin film substrate. In many applications, and preferably for the present invention, the thin film substrate is on a silicon diaphragm which is used to sense an exerted pressure in some pressure field. When such a strain gauge resistor experiences an increasing (decreasing) pressure, its resistance correspondingly increases (decreases). This change in resistance has a substantially linear characteristic with respect to pressure.

Not only are such strain gauge resistors sensitive to pressure, but because they are formed on a thin film substrate, they are substantially more sensitive to temperature than are standard resistors or those formed on a thick film substrate.

Resistors 32 and 34 are preferably structured such that they are substantially insensitive to temperature by forming them in thick film substrate. Further, it is preferred that resistors 32 and 34 not be mounted on the diaphragm. This will avoid pressure from effecting their resistance.

The resistors in each leg of the bridge are connected by respective output terminals 24 and 26. Output terminals 24 and 26 are used to measure the pressure sensed by the circuit. As will be discussed with FIG. 2, one of the strain gauge resistors, 28 or 30, is located at the inner section of the diaphragm, while the other resistor is located at the outer perimeter of the diaphragm. When pressure is exerted upon the diaphragm, this arrangement allows the resistor at the inner section of the diaphragm to experience a corresponding increase in resistance, while the resistor at the outer parameter of the diaphragm experiences only a slight change in resistance. The overall effect of the pressure exerted is a voltage differential at output terminals 24 and 26 which corresponds to, and effectively measures, the amount of pressure exerted upon the diaphragm.

As mentioned in the background, since bridge resistors in a conventional bridge circuit are typically all of a strain gauge type, the voltage differential at the output terminals of the bridge will change in opposing directions as pressure as well as temperature changes. However, since the bridge arrangement in block 12 includes only one leg having strain gauge resistors, temperature variations will not substantially effect the voltage of the output terminal in the opposite leg. This causes an "offset" voltage to develop, due to temperature, at the output terminals 24 and 26 in the bridge. This intentionally introduced offset voltage is compensated by block 14, as will later be discussed.

Block 10 of FIG. 1 depicts bridge input control circuitry which is used to control the excitation voltage at the bridge input terminal 20. As will later be shown, temperature induced voltage differentials at the bridge output terminals 24 and 26 can be compensated by controlling the excitation voltage at the bridge input terminal 20.

The circuitry in block 10 includes an amplifier 40, which utilizes resistor 42 in a feedback path around amplifier 40. Resistor 42 is connected to variable resistor 44 at the negative input terminal of amplifier 40 to set the gain of amplifier 40 for the controlling voltage at the bridge input terminal. Resistor 42 is preferably selected from the same type of material as strain gauge resistors 28 and 30 in block 12, and, for the embodiment shown in FIG. 1, it is preferably selected such that its nominal resistance is substantially twice the resistance of resistor 28 or 30.

Resistor 44 is also used to establish the correct voltage for compensation at the input terminal of the bridge and for sensitivity of the bridge to temperature.

Structurally, although resistors 28 and 30 are located in thin film on the diaphragm, resistor 42 is positioned adjacent the diaphragm such that it will experience the same temperature effects as resistors 28 and 30, but it will not experience any pressure effects. This is illustrated in FIG. 2.

Resistors 46 and 48 are connected to each other at the positive input of amplifier 40 to establish its reference voltage (Vref). Vref, and the value of resistor 44 are important parameters whose values are preferably determined using the formulas discussed below.

The last section of FIG. 1, block 14, provides amplification, and introduces an offset voltage to the output terminals 24 and 26 of the bridge. Block 14 includes an amplifier 60 having its inputs connected to the bridge output terminals. Resistor 64 serially connects output terminal 26 of the bridge to the negative input of amplifier 60, while variable resistor 66 serially connects output terminal 24 of the bridge to the positive input of amplifier 60. Hence, the difference voltage at the output terminals 24 and 26 of the bridge is established at the inputs of amplifier 60.

Resistors 70 and 72 are connected together to form a voltage divider. Resistor 68 serially connects the positive input of amplifier 60 to the voltage established by resistors 70 and 72. Resistors 68, 70 and 72 are used to offset the voltage at output terminal 24 of amplifier 60.

This offsetting function serves two purposes. First, in the absence of pressure upon the bridge, it will provide a voltage other than zero volts at the output of amplifier 60. Second, as discussed above, since an intentional offset drift was introduced by resistors 32 and 34 in block 12, this offsetting function may be used to subtract that intentional offset before amplifying the voltage at output terminals 24 and 26.

Resistor 62 is used to set the gain of amplifier 60 for the difference voltage appearing at its inputs. This is accomplished in a conventional manner by connecting resistor 62 from the output terminal to the input terminal (negative in this case) of the amplifier.

To facilitate adjustment to the desired amplification and offset voltage, it is preferred that resistors 62, 64, 66, 68 and 70 be variable type resistors.

Figure 2A:
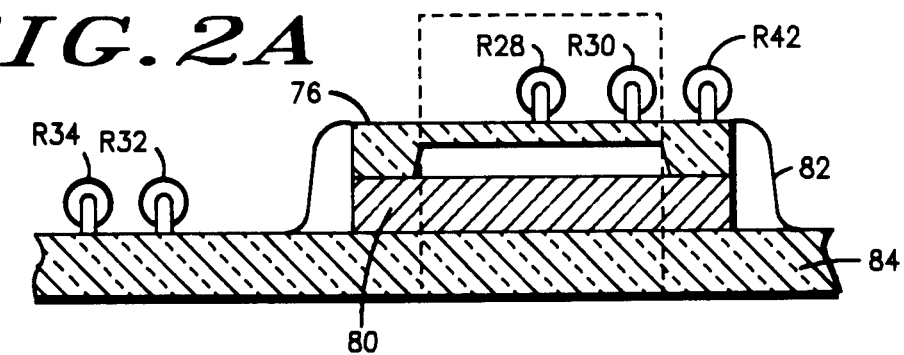
FIGS. 2a and 2b comprise a diagramatic view of certain resistors from FIG. 1, illustrating their placement about a diaphragm according to the present invention.
Figure 2B:
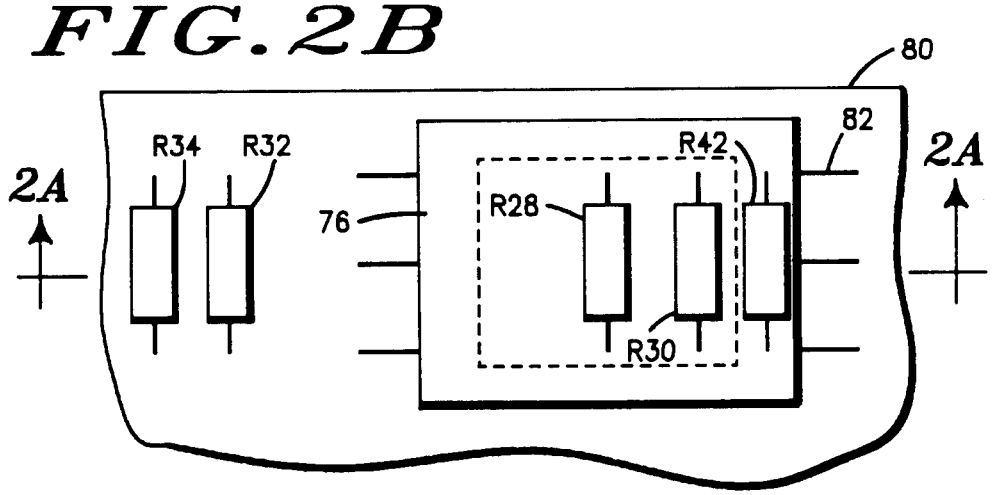

Referring now to FIGS. 2a and 2b, depicted is a preferred printed circuit structure which can accommodate the circuitry shown in FIG. 1. In FIG. 2a, a cross sectional view of the structure is shown. The structure includes a flexible member 76, such as a silicon diaphragm, a circuit board 84 and supporting glass 80 for the flexible member 76. The dotted lines capturing the center of the diaphragm illustrate the flexible area of the member. Further, leads 82 are shown which electrically connect flexible member 76 to circuit board 84.

The circuitry in FIG. 1 which is pertinent to the structure shown in FIGS. 2a and 2b includes resistors 28, 30, 32, 34 and 42. Resistor 28 is mounted in the center of flexible member 76. This enables resistor 28 to experience maximum resistance variance as pressure is exerted upon flexible member 76. Resistor 30 is mounted at the outer perimeter of the flexible area of the member so as to effect only slight resistance variance with the exerted pressure. As aforementioned, this allows a differential voltage to develop at the output terminals of the bridge which corresponds to the amount of pressure which is exerted upon flexible member 76.

The remaining two resistors 32 and 34 of the bridge are mounted on the circuit board 84, preferably on a thick film substrate. As discussed above, this prevents temperature variance from substantially effecting their resistance.

Resistor 42, which is used to temperature compensate the bridge, is mounted on the member 76 near its corresponding resistors (R28 and R30), but away from the flexible area of member 76. This allows resistor 42 to experience the same temperature variances as resistors 28 and 30, but prevents pressure from effecting its resistance.

It should be noted, however, that FIGS. 2a and 2b are merely illustrations, and that in the application the resistors are preferably in substrate, as previously mentioned.

It may be helpful at this time to briefly summarize the function of each of the three blocks (10, 12 and 14) in FIG. 1. In block 12, the bridge resistor arrangement is used to measure pressure exerted upon the strain gauge resistors 28 and 30. This measurement is in the form of a differential voltage at the output terminals of the bridge.

Because the strain gauge resistors in the bridge are extremely sensitive to temperature, compensation is needed to prevent two kinds of resistance variance. One kind is offset drift, i.e., where the output voltage is "offset" due to a change in temperature. The second kind of resistance variance is TC of voltage span, i.e. where the output voltage vs. pressure characteristic varies due to the voltage at the input terminal 20 changing due to temperature induced resistance changes in the bridge.

Block 10, in cooperation with block 12, compensates for these types of resistance variances. Resistor 42 in block 10 is used to monitor the temperature effecting strain gauge resistors 28 and 30, and is coupled in a feedback loop arrangement with amplifier 40 so as to control the voltage of input terminal 20. By calculating the appropriate reference voltage for the amplifier in block 10 as well the appropriate value of resistor 44, as discussed below, both types of these resistance variances are compensated.

Block 14 is used to amplify the bridge output differential, and to subtract an offset voltage intentionally introduced to the bridge output differential.

Calculations for the various resistor values are now discussed.

Offset drift may be compensated for by blocks 10 and 12 by calculating the correct resistor values according to the equations that follow. It should be noted, however, that if resistors 28 and 30 could be manufactured in thin film to "exactly" identical resistor values, compensation for offset drift would not typically be required.

Assurance that a change in temperature will not offset the difference voltage at the output of the bridge may be expressed mathematically by differentiating the difference voltage with respect to temperature. (In the following discussion resistor references are abbreviated. For example, resistor 28 will be referred to as R28.)

For the resistor arrangement in block 12, it can be shown that $$\frac{R34}{R32 + R34} = \frac{R30}{R28 + R30} + (R44 + R42) \cdot \frac{R28 \frac{dR30}{dT} - R30 \frac{dR28}{dT}}{\frac{dR42}{dT} \cdot (R28 + R30)^2}$$

Presuming that $$\frac{dR28}{dT} = \frac{dR30}{dT} = \frac{2dR42}{dT},$$

then the above equation can be approximated as:

$$\frac{R34}{R32 + R34} = \frac{R30}{R28 + R30} + (R44 + R42)\frac{R28 - R30}{2(R28 + R30)^2}. \quad \text{(eqtn. 1)}$$

Accordingly, by measuring the values of R28 and R30, and given that R42 is approximately the sum of R28 plus R30; R32 (or R34) can be selected with some freedom, and R34 (or R32) can be calculated using the above equation. Further, it should be noted that selection of R32 and R34 are preferably much greater, for example 50 times greater, than the values of R28 and R30 to allow for nominal sensitivity effected by R28 and R30. R44 is determined as subsequently described. Since the above values have been calculated for a zero difference voltage variation with respect to temperature, these values will prevent any difference voltage offset drift due to temperature.

Assurance that a change in temperature will not cause a TC of span voltage at the output of the bridge may be expressed mathematically in the following equations.

First, it can be shown that:

$$V_{ex} = V_{ref} \cdot \frac{R42 + R44}{R44} \quad \text{(eqtn. 2)}$$

Given that Vspan=K Vex, where k is a function of temperature and obtained from the bridge behavior under temperature variation, setting Vspan equal to a constant and differentiating the equation:

$$K \cdot V_{ex} = \text{Constant}$$

with respect to temperature, it can also be shown that $$R44 = \frac{-dR42/dT}{dK/dT} \cdot \frac{V_{span}(25° \text{ C.})}{V_{ex}} - R42(25° \text{ C.}) \quad \text{(eqtn. 3)}$$

and $$V_{ref} = \frac{R44}{\frac{-dR42/dT}{dK/dT} \cdot \frac{V_{span}(25° \text{ C.})}{V_{ex}^2}} \quad \text{(eqtn. 4)}$$

Vex can be selected for pressure sensitivity of the bridge. Typically, three volts is a desirable voltage. However, one skilled in the art can readily recognize that different applications may require alternative voltage levels.

Accordingly, equations 3 and 4 render two unknowns which can be solved using computer analysis. Since equation 3 solves for R44, equation 1 can now be completely solved and values of R32 and R34 may be selected.

The voltage at the output of amplifier 60 may be expressed as follows:

$$V_o = \frac{R62}{R64} \left[ \frac{R68}{R66 + R68} \cdot \frac{R64 + R62}{R62} \cdot V24 - V26 \right] +$$

$$\frac{R66}{R66 + R68} \cdot \frac{R64 + R62}{R64} V1, \text{ where } V1 \text{ is the voltage where } R70 \text{ and } R72 \text{ connect.}$$

For output equilibrium, R68/R66 is preferably equal to R62/R64 (which equals the amplification factor K of block 14). Given that these ratios are equal, the above $V_0$ equation can be simplified to $V_o = K \, V_p + V_{cm}$, where $V_p$ is the voltage at the output terminals of the bridge for a given pressure p, and $V_{cm}$ is the common mode output voltage given zero pressure.

Figure 3:
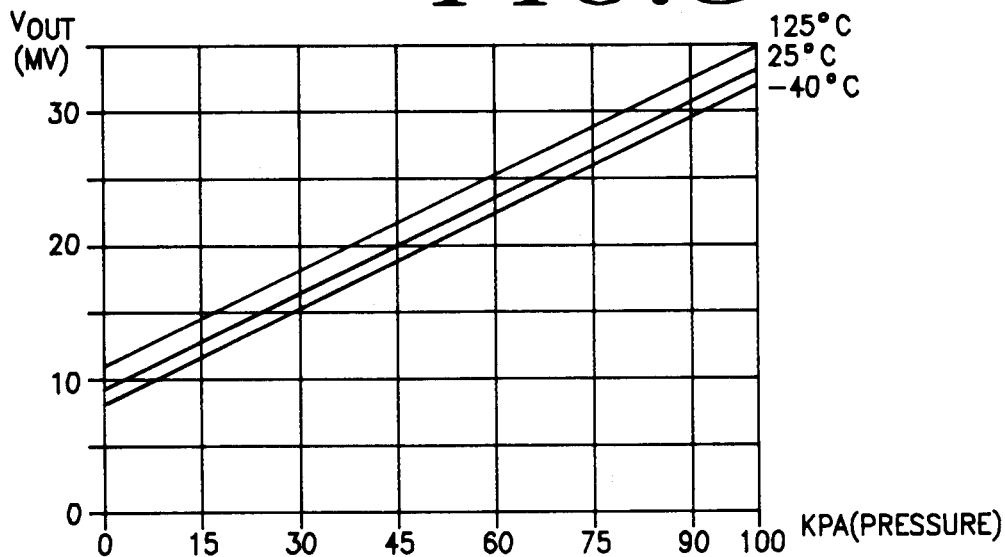
FIG. 3 is a graph illustrating voltage vs. pressure characteristics at the output of block 12 in FIG. 1 at given temperatures for selected resistor values and voltages using the first two blocks of the circuit of FIG. 1.

Referring now to FIG. 3, a voltage versus pressure plot is shown which was measured at the output of the bridge circuit for a specific application using the circuit in FIG. 1 and the arrangement in FIG. 2. On the vertical axis, the voltage differential at output terminals 24 and 26 of the bridge is plotted, and on the horizontal axis, the pressure exerted (in Kilo-Pascals) upon the flexible member is plotted. Measurements were taken for three temperatures, 125°, 25° and −40° C. It should be noted that the change in temperature did not effect different slopes in the plot. The slight offsets between temperatures are due to the effects of extraneuous resistances, such as the input and output impedances of amplifier 40, which were not taken into account for the above equations. However, these resistances can be accounted for to provide even greater temperature independent results.

The measurements illustrated in the graph of FIG. 3 were made using the circuit in FIG. 1 having the following values:

| Values given or measured | | |
|---|---|---|
| R28 = 415.30   R30 = 428.00 | | R42 = 834.80 @ 25° C. |
| dR42/dT = 1.2778 Ohms/°C. | | |
| $V_{span}$ = 50.195 mV | | |
| $dV_{span}/dT$ = −.0466 mV/°C. | | |
| dK/dT = −.0000155 | | |
| Vex = 3 Volts | | |
| Supply voltage = 5.0 Volts | | |
| Values calculated | | |
| R44 = 535.537 Ohms | | |
| Vref = 1.1648 Volts | | |
| R34/(R32 + R34) = .4952 (R32 = 20kOhms and | | |
| R34 = 19240 Ohms) | | |

The present invention therefore provides a new and useful apparatus to compensate for temperature induced fluctuations in a pressure sensing circuit, including TC of span voltage and offset drift. Further, by using two fixed valued resistors in the bridge circuit, offset drift due to temperature is compensated by intentionally introducing an offset in the bridge (so that the offset voltage may be differentiated with respect to temperature and set equal to zero), but later subtracted using a second amplifier.

While the invention has been particularly shown and described with reference to a preferred embodiment, it will be understood by those skilled in the art that various other modifications and changes may be made to the present invention described above without departing from the spirit and scope thereof.

What is claimed is:

1. A pressure sensing apparatus of the type which automatically compensates for temperature variance, and which may be mounted about a flexible member such that the resistance of one or more strain gauge resistors mounted thereon changes as pressure is exerted upon the flexible member, the pressure sensing apparatus comprising:

pressure sensing means for sensing pressure, said pressure sensing means having:
an input terminal for receiving an input voltage,
at least one first strain gauge resistor mounted on the flexible member,
at least one substantially fixed value resistor having a value based on, at least in part, the rate of change over temperature of said at least one strain guage resistor, and
at least one output terminal at which a voltage is developed which changes as pressure is exerted upon the flexible member; bridge control means coupled to said input terminal; and
an additional strain gauge resistor situated such that it experiences temperature variations which correspond to temperature variations experienced by said first strain gauge resistor, and coupled with said bridge control means such that the voltage at said input terminal is controlled by said bridge control means to compensate for temperature induced variances in said bridge means.

2. The pressure sensing apparatus according to claim 1, and wherein said bridge means further includes a second strain gauge resistor mounted on the flexible member and wherein the resistance value of said additional strain gauge resistor is approximately equal to the sum of the resistances of said first and second strain gauge resistors.

3. The pressure sensing apparatus according to claim 2, wherein said bridge control means further includes amplifier circuitry employing said additional strain gauge resistor in a feedback path around said amplifier.

4. The pressure sensing apparatus according to claim 1, wherein said bridge control means further includes amplifier circuitry employing said additional strain gauge resistor in a feedback path around said amplifier.

5. The pressure sensing apparatus according to claim 1, further including amplification circuitry, coupled to said output terminal, which includes circuitry to offset the voltage at said output terminal.

6. A temperature compensating pressure sensing apparatus, comprising:
a flexible member;
pressure sensing circuitry having an input terminal for receiving an input voltage, and including at least one first strain gauge resistor mounted on said flexible member;
an additional strain gauge resistor situated near said first strain gauge resistor such that it experiences temperature variations which correspond to temperature variations experienced by said first strain gauge resistor;
control circuitry having an amplifier which employs said additional strain gauge resistor in a feedback path with said amplifier to control the input voltage at said input terminal so as to compensate for temperature induced resistance variations of said first strain gauge resistor.

7. The pressure sensing apparatus according to claim 6, wherein said pressure sensing circuitry further includes a second strain gauge resistor mounted on the flexible member.

8. The pressure sensing apparatus according to claim 7, wherein the resistance value of said additional strain gauge resistor is approximately equal to the sum of the resistances of said first and second strain gauge resistors.

9. The pressure sensing apparatus according to claim 6, further including amplification circuitry, coupled to said output terminal, which includes resistor circuitry to offset the voltage at said output terminal.

10. A pressure sensing apparatus of the type which automatically compensates for offset drift and span temperature variance, and which may be mounted about a flexible member such that the resistance of one or more strain gauge resistors mounted thereon changes as pressure is exerted upon the flexible member, the pressure sensing apparatus comprising:
a pressure sensing bridge circuit for sensing pressure and having:
an input terminal for receiving an input voltage,
two strain gauge resistors mounted on the flexible member,
two substantially fixed value resistors, and
at least one output terminal at which a voltage is developed which changes as pressure is exerted upon the flexible member;
an additional strain gauge resistor situated such that it experiences temperature variations which correspond to temperature variations experienced by at least one of said strain gauge resistors; and
bridge control means having an amplifier which employs said additional strain gauge resistor to control the input voltage at the input terminal so as to compensate for temperature induced variances in the bridge circuit.

11. A pressure sensing apparatus, according to claim 10, wherein the values of the two substantially fixed value resistors are based on, at least in part, the rate of change over temperature of the two strain gauge resistors.

12. The pressure sensing apparatus, according to claim 10, wherein the values of the two substantially fixed value resistors are based on, at least in part, the value of said two strain gauge resistors.

13. The pressure sensing apparatus, according to claim 10, wherein the values of the two substantially fixed value resistors are based on, at least in part, the value of and the rate of change over temperature of the two strain gauge resistors.

14. A pressure sensing apparatus of the type which automatically compensates for temperature variance, and which may be mounted about a flexible member such that the resistance of one or more strain gauge resistors mounted thereon changes as pressure is exerted upon the flexible member, the pressure sensing apparatus comprising:
bridge means for sensing pressure, said bridge means having:
an input terminal for receiving an input voltage,
at least one first strain gauge resistor mounted on the flexible member,
at least one substantially fixed value resistor having a value based on, at least in part, the value of and the rate of change over temperature of said at least one first strain resistor, and
at least one output terminal at which a voltage is developed which changes as pressure is exerted upon the flexible member; bridge control means coupled to said input terminal; and
an additional strain gauge resistor situated such that it experiences temperature variations which correspond to temperature variations experienced by said first strain gauge resistor, and coupled with said bridge control means such that the voltage at said input terminal is controlled by said bridge control means to compensate for temperature induced variances in said bridge means.

* * * * *